US011994342B2

(12) United States Patent
Millar et al.

(10) Patent No.: US 11,994,342 B2
(45) Date of Patent: May 28, 2024

(54) HYBRID KILN FOR DRYING WOOD, BIOCHAR AND AGRICULTURE PRODUCTS

(71) Applicant: The George Washington University, Washington, DC (US)

(72) Inventors: Richard Clive Millar, Lexington Park, MD (US); Thomas A. Mazzuchi, Washington, DC (US); Todd Mlsna, Starkville, MS (US)

(73) Assignees: The George Washington University, Washington, DC (US); Mississippi State University, Starkville, MS (US)

( * ) Notice: Subject to any disclaimer, the term of this patent is extended or adjusted under 35 U.S.C. 154(b) by 426 days.

(21) Appl. No.: 17/277,826

(22) PCT Filed: Dec. 19, 2019

(86) PCT No.: PCT/US2019/067577
§ 371 (c)(1),
(2) Date: Mar. 19, 2021

(87) PCT Pub. No.: WO2020/132299
PCT Pub. Date: Jun. 25, 2020

(65) Prior Publication Data

US 2022/0113088 A1 Apr. 14, 2022

Related U.S. Application Data

(60) Provisional application No. 62/782,106, filed on Dec. 19, 2018.

(51) Int. Cl.
*F26B 9/06* (2006.01)
*F26B 3/04* (2006.01)
(Continued)

(52) U.S. Cl.
CPC ................ *F26B 3/283* (2013.01); *F26B 3/04* (2013.01); *F26B 9/06* (2013.01); *F26B 21/04* (2013.01);
(Continued)

(58) Field of Classification Search
CPC .... F26B 3/283; F26B 3/04; F26B 3/28; F26B 9/06; F26B 21/04; F26B 21/08;
(Continued)

(56) References Cited

U.S. PATENT DOCUMENTS 4,432,147 A * 2/1984 Chen ....................... F26B 3/286 34/93
5,269,076 A * 12/1993 Breckenridge ......... F26B 21/06 34/191
(Continued)

FOREIGN PATENT DOCUMENTS

NZ 535252 A * 2/2006 .............. F26B 21/06
WO WO-2006/053392 A1 5/2006

OTHER PUBLICATIONS

International Search Report and Written Opinion for PCT/US2019/067577, dated Feb. 25, 2020, 10 pages.

*Primary Examiner* — John P McCormack
(74) *Attorney, Agent, or Firm* — Blank Rome LLP

(57) ABSTRACT

A hybrid kiln system and method for drying material, such as lumber, logs, and timber. A solar air heater uses solar radiation to heat air. The heated air is pushed into a kiln using one or more solar air heater fans. A dehumidifier is also provided to dehumidify and heat the air within the kiln. A method for determining when the solar air heater fans and the dehumidifier should be activated is also provided, and is based upon the temperature difference between the solar air heater's interior and exterior, as well as the relative humidity within the kiln.

18 Claims, 7 Drawing Sheets

SCHEMATIC OF THE HYBRID SOLAR KILN

(51) Int. Cl.
*F26B 3/28* (2006.01)
*F26B 21/04* (2006.01)
*F26B 21/08* (2006.01)
*F26B 23/10* (2006.01)

(52) U.S. Cl.
CPC .............. *F26B 21/08* (2013.01); *F26B 23/10* (2013.01); *F26B 2210/16* (2013.01)

(58) Field of Classification Search
CPC .......... F26B 21/06; F26B 21/00; F26B 23/10; F26B 2210/16
USPC ............................................................ 34/526
See application file for complete search history.

(56) References Cited

U.S. PATENT DOCUMENTS

| | | | | |
|---|---|---|---|---|
| 5,555,732 | A * | 9/1996 | Whiticar | F24F 3/14 62/93 |
| 5,992,048 | A * | 11/1999 | DeVore | F26B 3/286 34/93 |
| 7,748,137 | B2 | 7/2010 | Wang | |
| 9,423,176 | B1 | 8/2016 | Girardi | |
| 2004/0006911 | A1* | 1/2004 | Hudson | C10L 1/328 44/301 |
| 2009/0113752 | A1* | 5/2009 | Weir | F26B 21/06 34/524 |
| 2018/0209736 | A1* | 7/2018 | Mallory | F26B 21/028 |
| 2019/0234686 | A1* | 8/2019 | Brodie | F26B 25/008 |

* cited by examiner

HYBRID KILN (SIDE VIEW ELEVATION)

SOLAR HYBRID KILN DESIGN (TOP VIEW)

HYBRID KILN (SIDE ELEVATION)

HYBRID KILN (FRONT ELEVATION)

HYBRID KILN INCLUDING CONTROLLER AND SENSOR

SCHEMATIC OF THE HYBRID SOLAR KILN

ALTERNATIVE VIEW OF THE HYBRID KILN WITH END AND SIDE VIEWS

FIG. 8 ALTERNATIVE CONFIGURATION OF THE HYBRID KILN

CONDENSATE FLOW METER

FAN SPEED SCHEDULE

HYBRID KILN FOR DRYING WOOD, BIOCHAR AND AGRICULTURE PRODUCTS

RELATED APPLICATION

This application is a national phase application of PCT/US2019067577, filed Dec. 12, 2019, which claims the benefit of U.S. Provisional Application No. 62/782,106, filed Dec. 19, 2018. The entire contents of these applications are incorporated herein by reference.

FIELD OF THE INVENTION

The present invention relates to systems and methods for drying materials. In particular, the invention relates a kiln for drying wood, biochar and agricultural products.

BACKGROUND OF THE INVENTION

One method for drying timbers and logs is open air drying, preferably under cover. This approach requires low capital cost and minimal operating cost. However, such known methods require a considerable amount of time and are subject to the vagaries of the weather, in particular humidity.

One alternative method that is widely used to address the deficiencies of open air drying is forced air drying, where fans are used to force ambient air through a stack of lumber, timber, or logs. Forced air drying offers some means to compensate for varying climatic conditions, but does involve a significant use of electric power. In a humid climate this approach may be ineffective since it is difficult to achieve a sufficiently high moisture content gradient between the material to be dried and the material's ambient air.

The drying process is further complicated by the changes in temperature and humidity throughout the seasons and throughout each day.

In another alternative method, a solar air heater is used to absorb solar radiation and generate heated air. The heated air is circulated around the stack of lumber, timber, or logs. Although this approach saves energy, a solar air heater does not generate sufficient heat when there is little or no sunlight, for example, on cloudy days or at night time.

Another method for drying materials is the use of fuel (gas, oil or biomass) to heat a closed lumber kiln. However, such kilns have low energy efficiency and require complex controls to prevent drying the material too quickly. Wood products crack, split, or warp when dried too quickly, particular larger size timbers.

There exists a need for a hybrid kiln that addresses the various drawbacks of the above methods.

SUMMARY OF THE INVENTION

In one aspect, the invention provides a hybrid kiln comprising a solar air heater that is fluidly connected to a kiln. Air, such as heated air, from the solar air heater is drawn into the kiln using one or more fans. One or more dehumidifiers are also fluidly connected to the kiln. One or more circulation fans within the kiln are positioned to circulate air throughout the kiln. One or more exhaust vents are also provided to allow air within the kiln's interior space to escape.

In another aspect of the invention, temperature and humidity sensors are positioned at the solar air heater, at the interior space defined by the kiln, and at the space exterior to the hybrid kiln. A controller is also provided to exchange data signals with the sensors, as well as to exchange data signals with the one or more heater fans, the one or more circulation fans and the one or more dehumidifiers. The controller controls the fans and the one or more dehumidifiers based on computer executable instructions or other control means.

In another aspect of the invention, a method is provided for operating the hybrid kiln, comprising measuring the temperature difference between the solar air heater and the exterior atmosphere. If the air from the solar air heater is more than a certain temperature threshold difference above the ambient air temperature in the exterior space, then the one or more heater fans and the circulation fans are activated. If not, and the relative humidity of the kiln's interior space is measured to be above a threshold, then the dehumidifier and the circulation fans are activated. If the air from the solar air heater is below the temperature threshold difference relative to ambient, and the relative humidity is below the threshold, then neither the dehumidifier nor the fans are activated.

BRIEF DESCRIPTION OF THE DRAWINGS

Embodiments of the invention will now be described with reference to the appended drawings wherein.

DETAILED DESCRIPTION OF THE INVENTION

Figure 1:
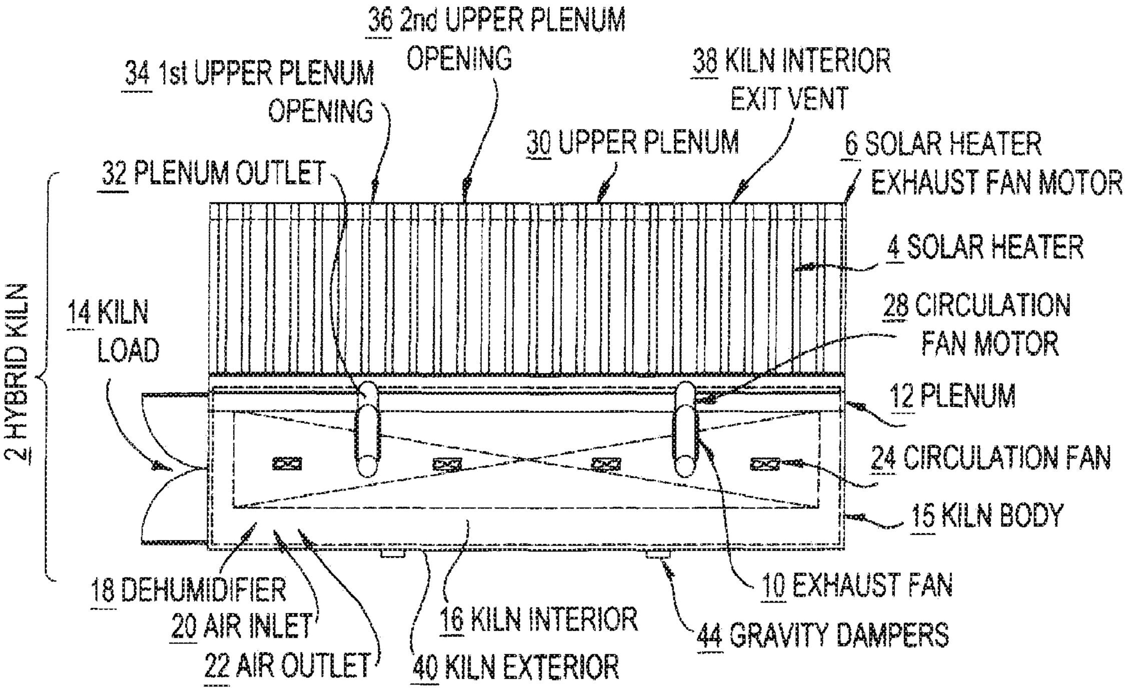
FIG. 1 is a schematic diagram of a hybrid kiln from a side elevation view according to one aspect of the invention.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Forced air kilns for drying material, such as lumber, wood, or logs, may consume lots of electrical power. In some kilns that use solar power, the rate of drying may be disrupted based on the variations in the environmental conditions throughout the day and throughout the seasons. For example, on cloudy days and overnight periods, the material in the kiln may reabsorb moisture and reduce the overall drying rate.

To address one or more of the above concerns, the present invention provides a hybrid kiln for drying materials, for example timber, wood and lumber, agricultural and food products, comprising a solar air heater and a dehumidifier. The solar air heater heats the air within itself using solar energy, and the heated air is then circulated throughout the kiln. The dehumidifier lowers the relative moisture content of the air in the kiln and warms the kiln charge when solar energy is unavailable. The dehumidifier removes moisture from the air and the dehumidifier and fan cooperate to speed up drying time of the product being dried.

For clarity of terminology, it will be understood that a kiln herein generally refers to a partial or full enclosure for the purpose of drying material. A hybrid kiln herein means a kiln system that uses more than one source of energy to dry material. A kiln body herein means a structure forming the enclosure of the kiln. A kiln interior herein means the space within the kiln for holding material for drying. A kiln load, also referred to as a kiln charge, herein means the material placed in the kiln interior for drying. A solar air heater herein means a device that heats air using solar energy. A dehumidifier herein means a device that reduces the humidity in the air. Humidity herein generally means the amount of water in the air. Relative humidity is preferably used herein to express humidity relative to the maximum level attainable at a given temperature. Other non-limiting expressions of humidity include absolute humidity and specific humidity. Wood products means lumber, timber, logs, etc. and agricultural products means tea, coffee, etc.

In FIG. 1, an embodiment of a hybrid kiln 2 is schematically shown from a side elevation view. The hybrid kiln 2 comprises a kiln body 15 that defines a kiln interior 16. The kiln body 15 has four side walls 64, a bottom or floor and a top or ceiling, that together form a complete sealed enclosure having the interior space 16.

The hybrid kiln 2 also comprises a solar air heater 4 and a dehumidifier 18. Examples of solar air heaters include large black or dark body panels. Some solar air heaters may have a translucent or transparent window that covers a box, whereby the interior surfaces of the box are dark or black in color to absorb solar radiation and emit heat. The window traps the heat emitted by the interior surfaces. Other examples of solar air heaters include tubing or piping that is snaked within the heater space for collecting the heated air. Some types of solar air heaters may have blackened perforated surfaces to air draw through from the exterior 40. Commercial examples of solar air heaters include SolarDuct™ and SolarWall™, and an array of solar panels can be utilized. It will be appreciated that the purpose of a solar air heater is to heat air using solar power, and any type or variation of solar air heater to that end is encompassed by the scope of this invention. However, the solar heater 4 used in one embodiment of the present invention, heats the interior space 16, but does not introduce external air (which might otherwise introduce unwanted humidity, dirt and insects) into the interior space 16 of the kiln body 15. For example, the kiln body 15 can form a sealed enclosure that is substantially airtight, and internal air can be drawn across the solar heater 4 by one or more fans to pull heat into the interior space 16.

Figure 4:
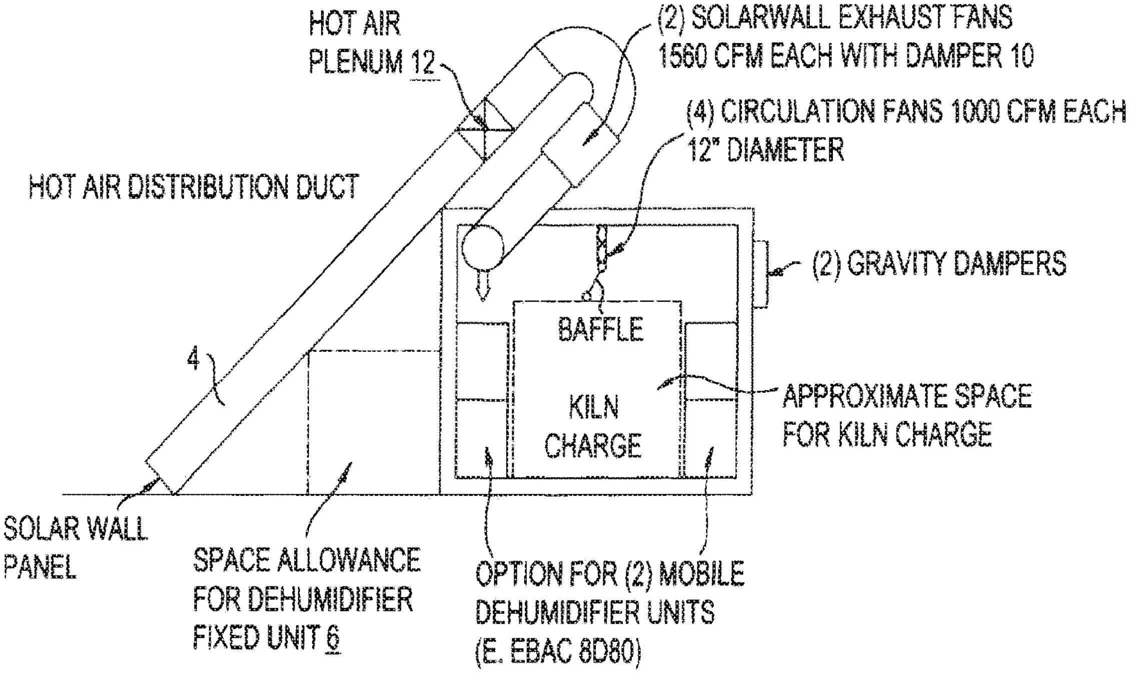
FIG. 4 is a front elevation view of the hybrid kiln in FIG. 2.

In the embodiment shown in FIGS. 1, 4, the solar air heater 4 is positioned above the kiln body 15 and is slanted upwards at an angle to face the sun. However, it can be appreciated that different types of solar air heaters 4 will produce more or less heat when oriented at different angles or placed at different positions relative to the kiln body 15. Any orientation or position for the solar air heater 4 that captures solar energy for producing heated air is applicable to the principles described herein.

A plenum or air channel 12 leads from the solar air heater 4 to the kiln interior 16. The plenum 12 has an outlet 32 to allow air to flow from the plenum 12 to the kiln 16. A solar heater exhaust fan 10 is positioned in the plenum 12 or at the outlet 32, in order to draw air from the solar air heater 4 to the outlet 32. The solar heater exhaust fan 10 is driven by a motor. The plenum 12 can form a closed loop that is sealed so that only heat is introduced to the interior, and not external air that might otherwise introduce unwanted humidity into the kiln interior.

Figure 6:
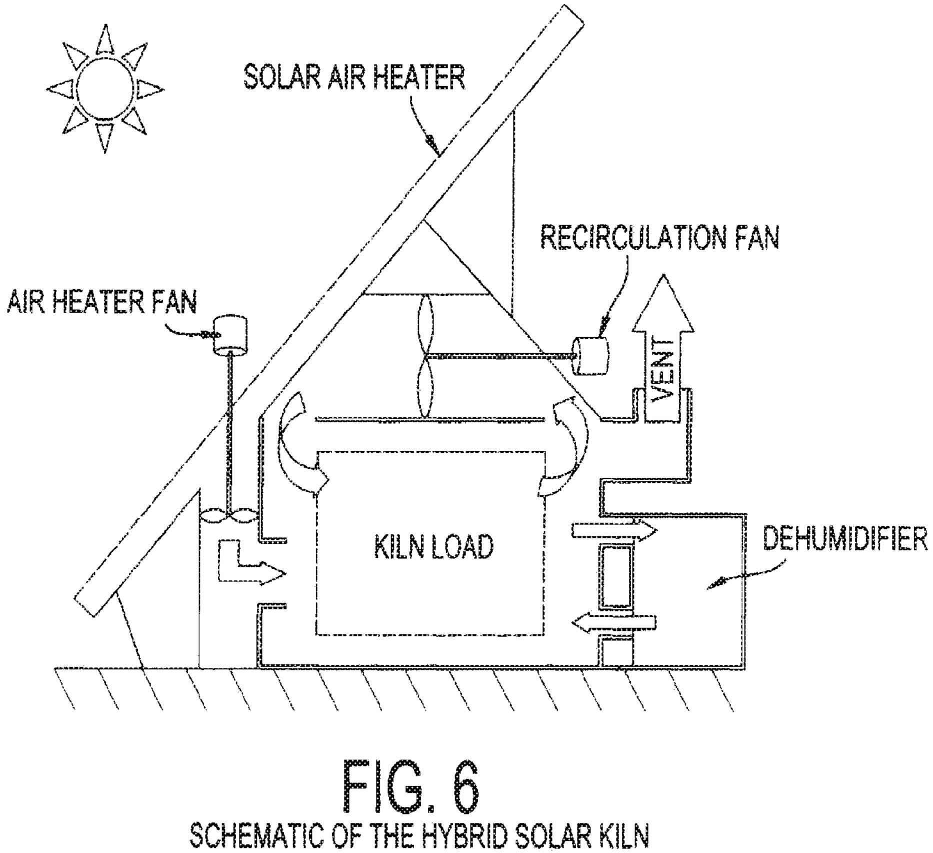
FIG. 6 is a schematic of the hybrid solar kiln.
Figure 7:
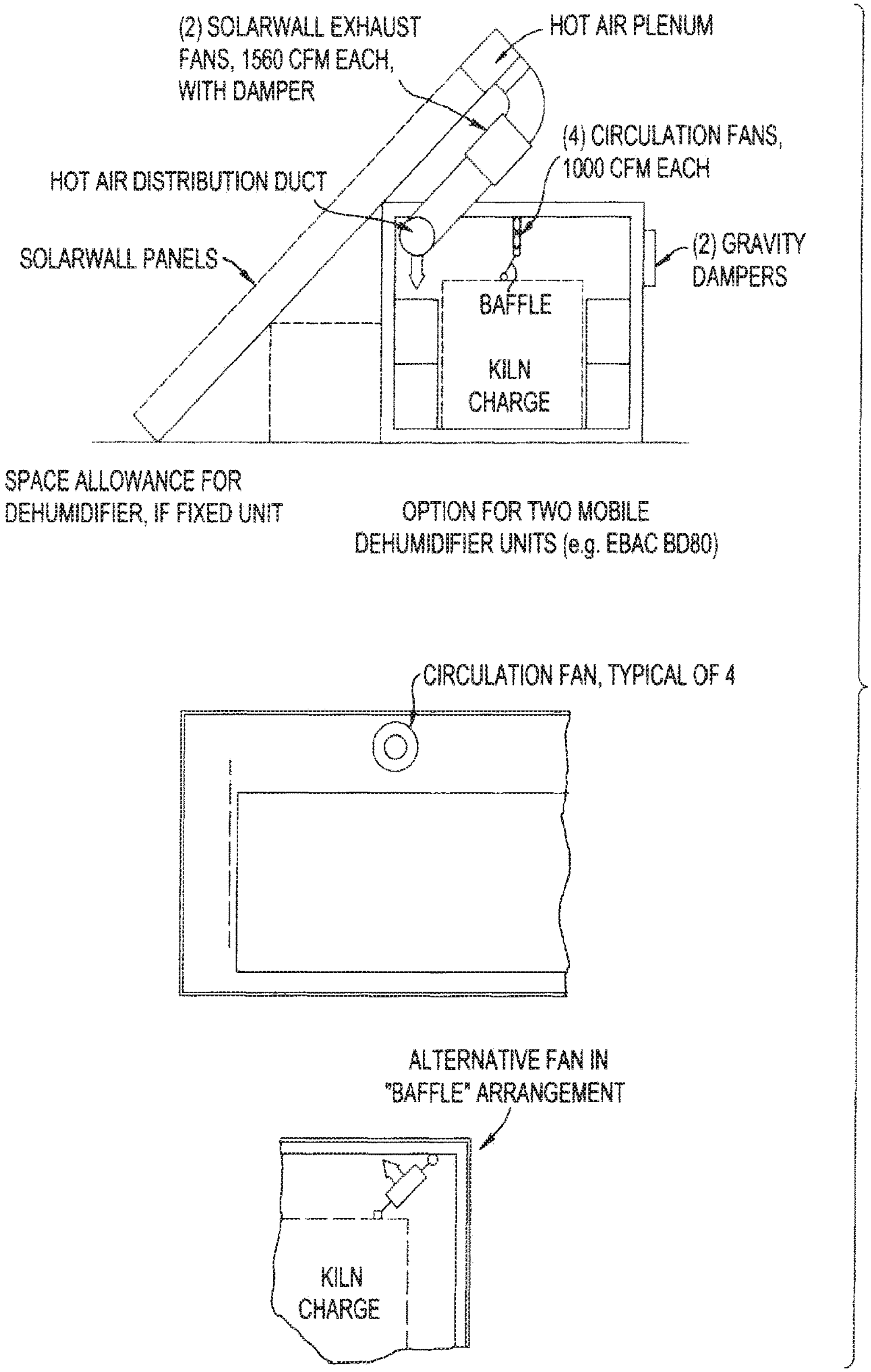
FIG. 7 is an alternative view of the hybrid kiln with end and side views.

As best shown in FIG. 6, a kiln load 14 may be positioned within the kiln interior 16. Typically, the kiln load 14 will comprise wood or wood products. However, as will be understood by a person skilled in the art, the hybrid kiln 2 of the present invention may be used to dry any material. A dehumidifier 18 is also provided in association with the kiln interior 16. An inlet 20 allows air from the kiln interior 16 to flow to the dehumidifier 18, and an outlet 22 allows air to flow from the dehumidifier 18 to the kiln interior 16. It will be appreciated that the dehumidifier 18 serves to reduce the level of humidity in the air. Non-limiting examples of dehumidifiers that can be used in the invention include mechanical or refrigerative dehumidifiers, desiccant type dehumidifiers, and electronic dehumidifiers. The dehumidifier 18 may or may not contain its own fans (not shown) for drawing in air and pushing air through the inlet 20 and outlet 22, respectively. If the dehumidifier 18 does not contain its own fans, then fans may be installed at the inlet 20 and the outlet 22. One or more dehumidifiers 18 can be positioned about the kiln load 14.

Continuing with FIG. 1, an upper plenum 30 may be provided within the kiln body 15, above the kiln interior 16. A first opening 34 and second opening 36 in the plenum 30 allow air from the kiln interior 16 to enter and exit the plenum 30, respectively. Preferably, the first opening 34 is located further away from the outlet 32 of the solar heater plenum 12 and the second opening 36 is located closer towards the outlet 32. Such a configuration encourages or pushes air, including the heated air originating from the solar air heater 4, to move in a circular or re-circulating fashion through the kiln interior 16, as shown in FIG. 6 by the large curved arrows. A circulation fan 24 is positioned within the upper plenum 30 to draw air in from the first opening 34 and push air out the second opening 36. The circulation fan 24 is driven by a motor 28. The circulation fans can direct air to or around the product being dried.

An exit vent 38 is provided on the kiln body 15 to allow air from the kiln interior 16 to escape. As shown in FIG. 1, the vent 38 is located in the side wall 64 and communicate air from the kiln interior 16 to the kiln exterior 40, and allows air in kiln interior 16 to be vented externally.

In one embodiment of the invention, the hybrid kiln 2 shown in FIG. 1 operates by first placing the kiln load 14 into the kiln interior 16. During the day, the solar air heater 4 absorbs solar radiation and produces heated air. The heated air from the solar air heater 4 is drawn through the plenum 12 and out the outlet 32 using a solar heater fan 10. The heated air from the outlet 32 passes through or over the kiln load 14. Some of the heated air will then flow upwards through the first opening 34, across the upper plenum 30, and out the second opening 36. This air re-circulation is generated by the fan 24 in association with the upper plenum 30. Some of the air from the kiln interior 16 may pass through the dehumidifier 18 through the inlet 20. A portion of the air circulating in the kiln interior 16 must vent to the exterior 40 through the exit vent 38 to balance the air introduced from the air heater by solar heater fan 10. Thus, the vent 38 prevents pressure from building up inside the kiln interior 16 that might otherwise reduce the circulation of air in the kiln interior 16.

Figure 8:
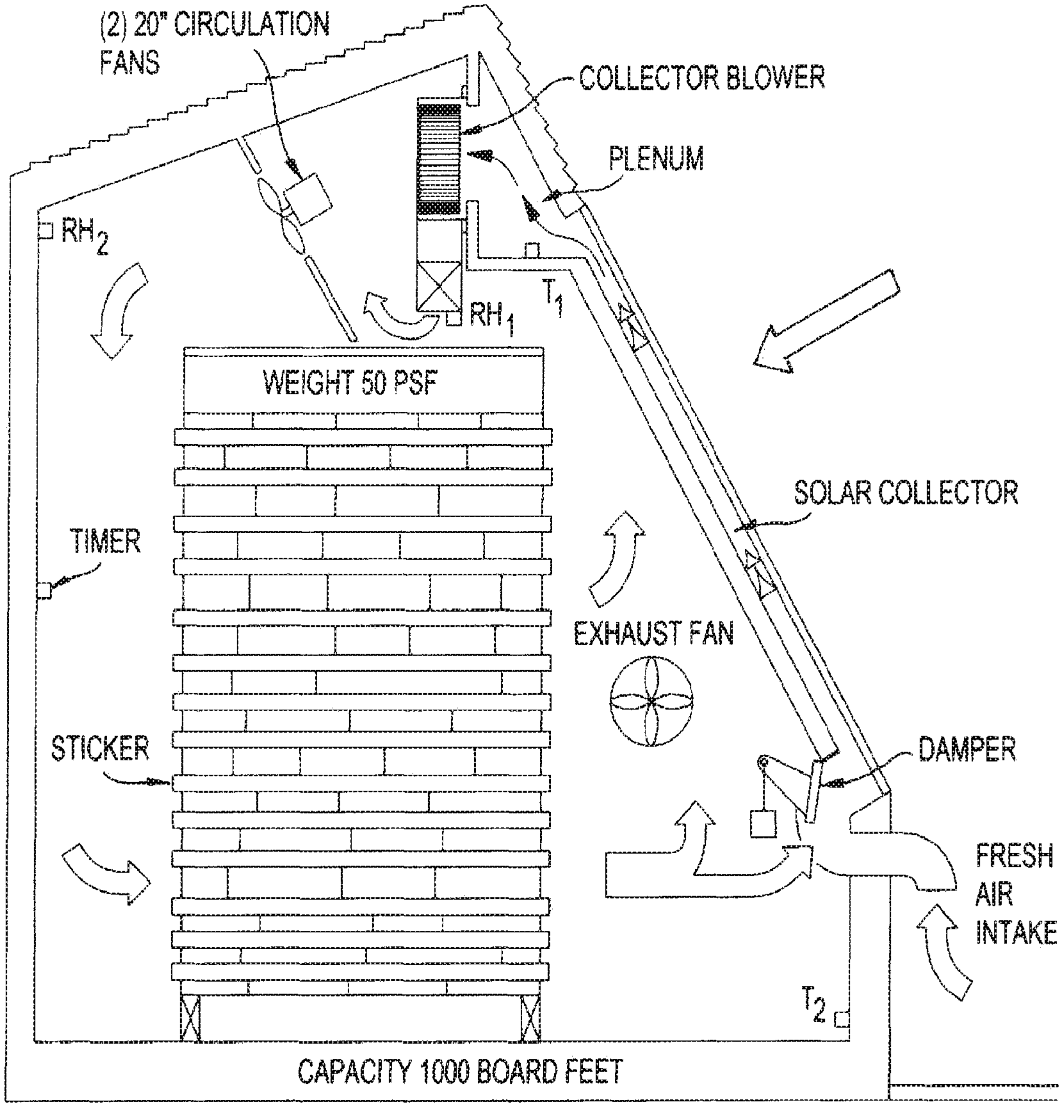
FIG. 8 is an alternative configuration of the hybrid kiln.

Turning to FIGS. 2-8, different views of another embodiment of a hybrid kiln 2 are provided. FIGS. 1-7 show embodiments where the kiln body 15 is rectangular prism or cuboid shape, and can be a preconstructed container such as a shipping container. And the solar collector is a separate component that is mounted to the container so the solar collector can be sized as large as possible and positioned at the best angle to collect sunlight and generate heat. In contrast, FIG. 8 shows the kiln body 15 having a customized shape with at least one angled side formed by the solar collector and an angled roof.

In FIG. 1, showing a top plan view, the solar air heater 4 is shown. Preferably, although not necessarily, when the hybrid kiln 2 is positioned in the northern hemisphere, the solar air heater 4 faces towards the south in order to increase exposure to solar radiation throughout the day when the sun moves from east to west. Similarly, when the hybrid kiln 2 is positioned in the southern hemisphere, it may be desirable to orient the solar air heater 4 to face northwards to increase exposure to solar radiation.

A hot air plenum 46 extends along the top of the solar air heater 4. The hot air generated from the solar air heater 4 is collected in the hot air plenum 46. The hot air from the hot air plenum 46 is then drawn through piping or plenums 48 into the kiln interior 16. One or more fans 10 are positioned within the piping or plenums 48 to pull hot air from the hot air plenum 46 and push hot air into the kiln interior 16. It will be readily understood that the purpose of the one or more fans 10 is to push hot air from the solar air heater 4 into the kiln interior 16, and any position or location (e.g. exterior to the piping or plenums 48) of the one or more fans 10 to that end is encompassed by the scope of this invention. Two pipes or plenums 48 are shown at different positions along the length of the solar air heater 4 in order to evenly distribute the hot air. It will be appreciated that any number of pipes or plenums 48 may be provided.

Figure 3:
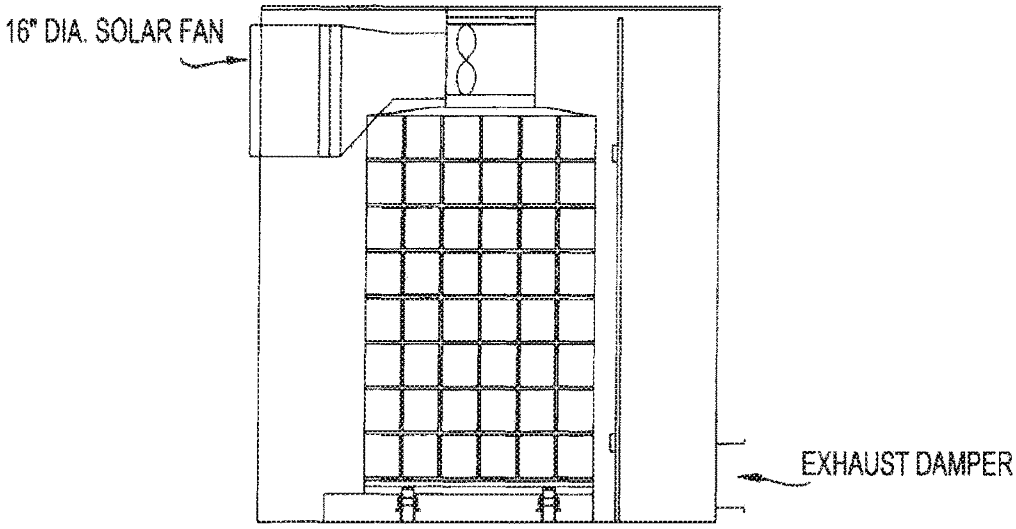
FIG. 3 is a side elevation view of the hybrid kiln in FIG. 2.

As can be best seen from the side elevation view in FIG. 3, the pipes or plenums 48 direct hot air towards a hot air distribution duct 50 located within the kiln interior 16. In one embodiment, such as shown in FIG. 4, the pipes or plenums 48 have a curved “U” shape. A person skilled in the art will appreciate that any shaped pipe or plenum 48 that serves to distribute air from the solar air heater 4 to the distribution duct 50 is applicable to this invention. The distribution duct 50 may be positioned at the upper portion of the kiln interior 16 and comprises one or more outlets 52 that distribute hot air through the kiln interior 16. A person skilled in the art will appreciate that any length or shape of the distribution duct 50 that distributes air throughout the kiln 16 is encompassed by the scope of this invention. Also shown in FIG. 3 are the heater fans 10. In one example embodiment, the heater fans 10 are capable of generating flow rates of 1560 cubic feet per minute. Fans with other performance specifications are also encompassed by the scope of this invention. Each pipe 48 may also have installed therein a damper (not shown), preferably in close proximity to the fan 10 to regulate the flow of air passing through the pipe 48.

Returning to FIG. 2, one or more circulation fans 24 may also be provided in the kiln interior 16 to circulate air throughout the kiln interior 16. In the embodiment shown in FIG. 5, there are four circulation fans 24 positioned in spaced relation along the length of the kiln interior 16. As shown in FIG. 3, the fans 24 are positioned at the top of the kiln interior 16. In particular, each of the fans 24 may be positioned at the underside 54 of the top surface of the kiln body 15. A baffle 56 may also be attached to each of the fans 24. The baffle 56 may be used to direct the flow of air through the fan 24. Although not shown, it can be appreciated that there may also be one baffle that extends along the length of the kiln interior 16 and is used in conjunction with multiple fans 24.

Figure 5:
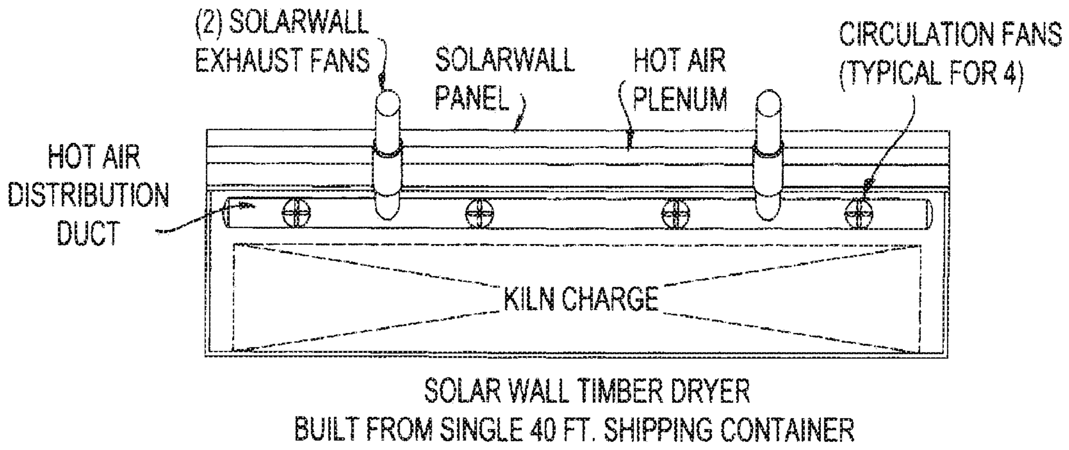
FIG. 5 is schematic diagram of an embodiment of a hybrid kiln system including a controller and sensors according to another aspect of the invention.

In addition or in the alternative, the circulation fans 24 may be positioned in the corner of the kiln interior 16 and at an angle (e.g. 45 degrees) to the walls of the kiln 16 to divert air around the corners of the kiln interior 16. This configuration is best seen in FIG. 5 at the circular inset diagram.

In one embodiment of the invention, each circulation fan 24 may have a 12-inch diameter and may be capable of generating flow rates of 1000 cubic feet per minute. Other sizes of fans with other performance parameters are also encompassed by the scope of this invention.

Figure 2:
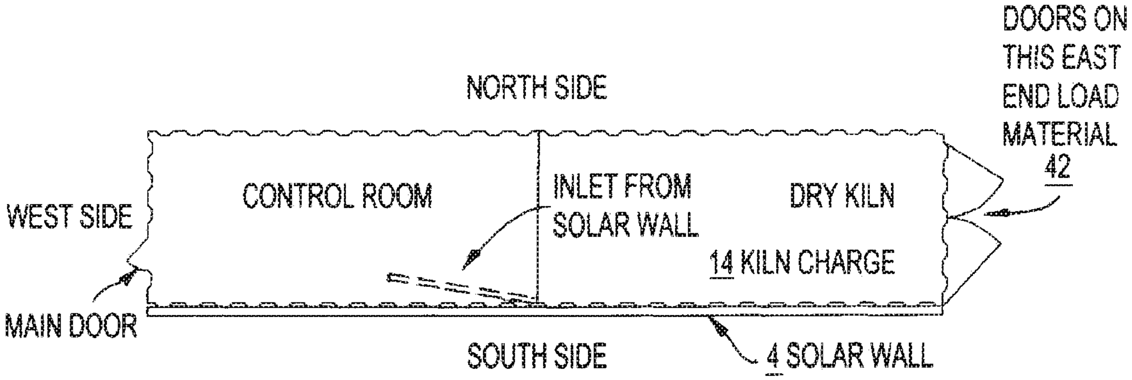
FIG. 2 is a top plan view of another embodiment of a hybrid kiln according to one aspect of the invention.

In one aspect of the invention, the kiln body 15 is a container that is shaped and dimensioned to hold lumber, timber, logs, agricultural products, biochar, etc. In one embodiment as shown in FIGS. 2-4, the kiln body 15 may comprise a 40 or 48 foot long shipping container of rectangular geometry with a depth of about 5 feet 5 inches and a height of about 7 feet. The invention is not limited to any size, shape or dimension, however a standard sizes shipping container can be readily transported to an on-site location for use and removal, and also protects the interior.

In one embodiment, the solar air heater 4 may be 40 feet long, to match the length of the kiln body 15, and 13 feet tall. However, it will be understood that the solar air heater 4 is not limited to any shape or dimension. It will be appreciated that a larger area (e.g. 520 square feet) can absorb more solar radiation to produce more heat to dry the charge faster, if desired.

As shown best in FIG. 2, one or more doors 42 can be positioned in one or more of the side walls 64. The doors 42 provide access to the kiln interior 16 and allow the kiln load 14 to be positioned or loaded within the kiln interior 16, as well as to be removed or unloaded. The pair of doors 42 shown are of the swing-type. Other doors, for example sliding doors, that open and close-off the space within the kiln interior 16 are also applicable the principles described herein.

One or more gravity dampers 44, also referred to as gravity shutters or back draft dampers, may be placed at each of the one or more exit vents 38 of the kiln body 15. A gravity damper 44 comprises a set of blades or shutters, usually horizontally aligned, that lift to an open position when air under pressure escapes from a first section to a second section. Usually, the first section has higher pressure than the second section. When there is insufficient air pressure to lift the blades or shutters, then the blades or shutters fall to a closed position due to gravity. This prevents air from the second section from flowing back into the first section. In the hybrid kiln 2, the gravity dampers 44 reduce or prevent air from the exterior 40 from flowing back into the kiln interior 16, that might otherwise introduce cold and/or humid air into the kiln interior 16. Shown in FIGS. 1 and 4, there are two gravity dampers 44 that are in spaced relation along a side wall 64 of the kiln body 15, whereby the side wall 64 faces away from the solar air heater 4. It can be appreciated that any number of gravity dampers 44 may be positioned at various locations along the kiln body 15.

One or more dehumidifiers 18 may be placed within and/or near the kiln body 15. When the dehumidifier is positioned at the kiln exterior 40, an intake and output duct, tube or plenum are connected between the kiln interior 16 and the dehumidifier 18. The intake duct draws air from the kiln interior 16 into the dehumidifier, and the output duct returns dehumidified air into the kiln interior 16. In one embodiment best seen in FIG. 4, a dehumidifier 18 may be placed within the space 60 defined by the underside of the solar air heater 4 and one of the exterior side walls 58 of the kiln body 15. As can be seen, the solar air heater 4 leans at a slant towards the exterior wall 58, thereby forming a triangular-shaped space 60 there between. Positioning a dehumidifier 18 within this space 60 allows for a more compact design for the hybrid kiln 2.

One or more dehumidifiers 18 may instead or also be placed within the kiln interior 16, for example against the side walls of the kiln body 15. Such a configuration also allows for a compact design. The purpose of the dehumidifier 18 is to draw air from the kiln interior 16 into the dehumidifier and return dehumidified air to the kiln interior 16, and any position of the dehumidifier 18 that achieves that purpose is encompassed by the scope of the invention.

Many of the components (e.g. solar air heater 4, circulation fans 24, heater fans 10, dehumidifier 18, kiln body 15, etc.) may be commercially available and assembled together. A kit of parts comprising the components described herein may be sold together and assembled according the description and drawings provided herein.

Turning to FIG. 5, another embodiment of a hybrid kiln system 2 including one or more sensors 84, 86, 88 and a controller 80 is provided, though sensors can be utilized with any embodiment provided herein. Within the solar air heater 4 are one or more internal environment sensors 84 that measure the humidity, or relative humidity, and the temperature of the air in the kiln interior 16. The internal sensors 84 may comprise a separate relative humidity sensor and a separate temperature sensor, or may comprise a single sensor capable of measuring both relative humidity and temperature. Also positioned within the kiln interior 16 are one or more circulation fans 24. One or more solar air heater fans 10 and one or more dehumidifiers 18 may be positioned within the kiln interior 16, or alternatively, may be positioned exterior to the kiln body 15 and fluidly connected to the kiln interior 16. There is also an ambient environment sensor 86 positioned exterior to the kiln body 15. The sensor 86, similar to internal sensor 84, measures the exterior temperature or relative humidity, or both. A solar air heater sensor 88 measures the temperature or relative humidity, or both, within the solar air heater 4.

The controller 80 is an electrical device or a computing device for executing computer readable instructions, such as a processor or processing device. The controller 80 is electrically connected to the sensors 84, 86, 88, the fans 24, 10 and the dehumidifier(s) 18. The controller 80 receives the sensed conditions from the sensors 84, 86, 88, for example, the sensors 84, 86, 88 send signals regarding the temperature or humidity, or both, to the controller 80.

The controller 80 then determines the appropriate settings for the fans 24, 10 and dehumidifiers 18, such as power (e.g., ON/OFF) and level (e.g., high, medium, low), based on the received sensed conditions. The controller 80 then sends a control signal to each of the fans 24, 10 and dehumidifiers 18 to control operation of those devices. The fans 24, 10 are controlled through a signal from the controller 80 that activates or turns off the motor or motors that power the fans 24, 10. The dehumidifiers 18 may also be controlled, or activated and deactivated, by signals sent from the controller 80. A memory device 82 may be integrated with or connected to the controller 80. The memory device 82 holds information, such as thresholds and computer executable instructions, and the controller 80 can access such information.

It can be readily understood that the controller 80 controls the operation of the hybrid kiln 2 by activating or deactivating the solar air heater fan(s) 10, the dehumidifier(s) 18 and the circulating fan(s) 24. The activation and deactivation of these components may be based in part on the temperature or humidity, or both, as measured by the sensors 84, 86, 88. All, some, or none of the sensors 84, 86, 88 may be used during the operation of the hybrid kiln 2. For example, the temperature sensor detects the temperature inside the kiln interior. The controller 80 receives the sensed temperature, compares the sensed temperature to a threshold temperature, and turns the fans 10 ON if the temperature is below the threshold to increase the temperature inside the kiln, and turns the fans 10 OFF if the temperature is above the threshold temperature. And the humidity sensor detects the humidity inside the kiln interior. The controller 80 receives the sensed humidity, compares the sensed humidity to a threshold humidity, and turns the dehumidifier ON if the sensed humidity is above the threshold humidity to remove humidity from the air, and turns the dehumidifier OFF if the sensed humidity is below the threshold humidity.

Figure 9:
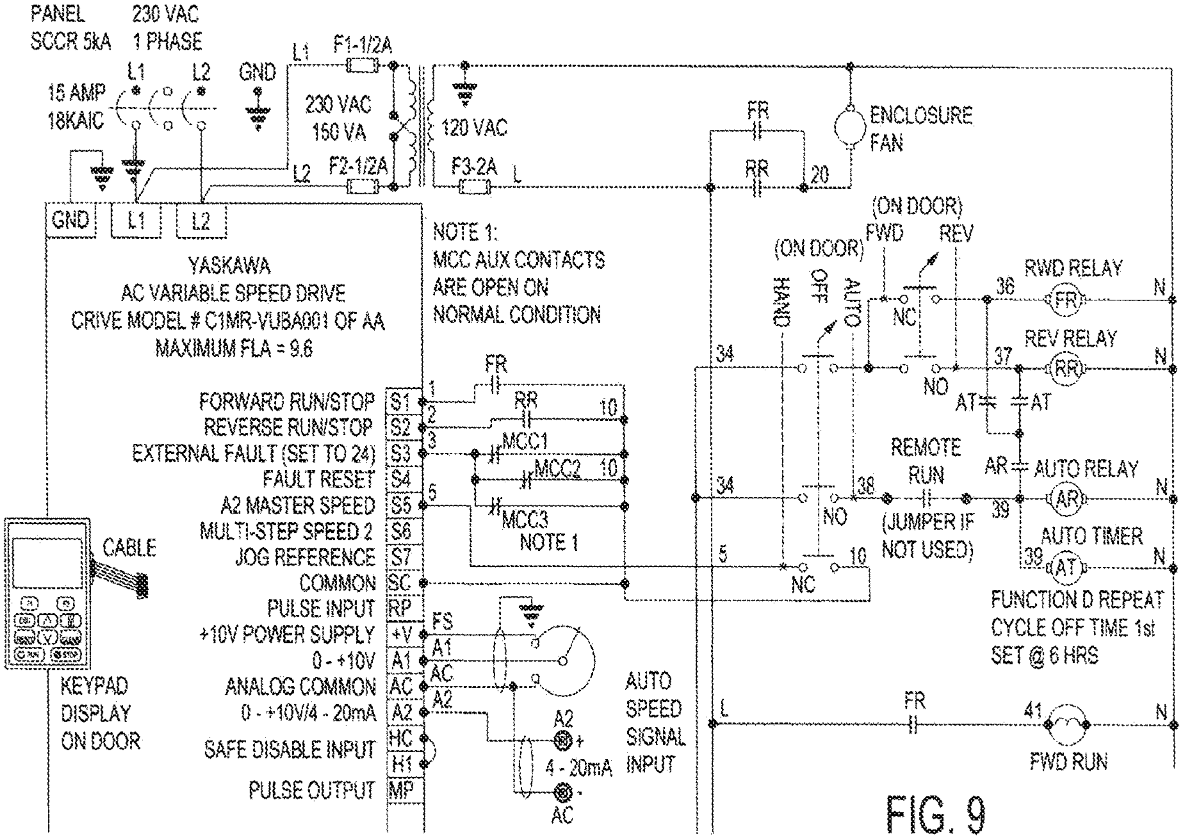
FIG. 9 is the controller wiring diagram.

The controller 80 may also be activated and deactivated in order to allow a human operator to override the control of the components within the hybrid kiln 2, and to set the thresholds for the desired conditions inside the kiln interior, such as temperature and humidity. FIG. 9 is a wiring diagram of the hybrid kiln controller.

More generally, the operation of the components in the hybrid kiln 2 are controlled by the various computer executable instructions or algorithms executed by the controller 80. It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the controller 80 or accessible or connectable thereto. Any application or module herein described may be implemented using computer readable/executable instructions that may be stored or otherwise held by such computer readable media.

FIG. 8 shows a solar collector. Exterior air enters through a fresh air intake controlled by a damper, into a plenum. The solar collector heats the air in the plenum. The heated air travels up the plenum and is pulled into the kiln interior by a collector blower. The heated air is circulated inside the kiln interior by circulation fans. Air inside the kiln interior can also enter the plenum through the damper.

Moisture Detector

Another feature of the present invention is a Novel Solar Hybrid Kiln with automated control and measuring device water measuring, or moisture detector, for controlling the drying. The solar hybrid kiln design is novel not only in design but also in the control of the drying process. A moisture measurement device is provided that measures the moisture content of the product being dried so that the product can be dried to a desired moisture content and avoid the product being over dried or under dried.

Figure 10:
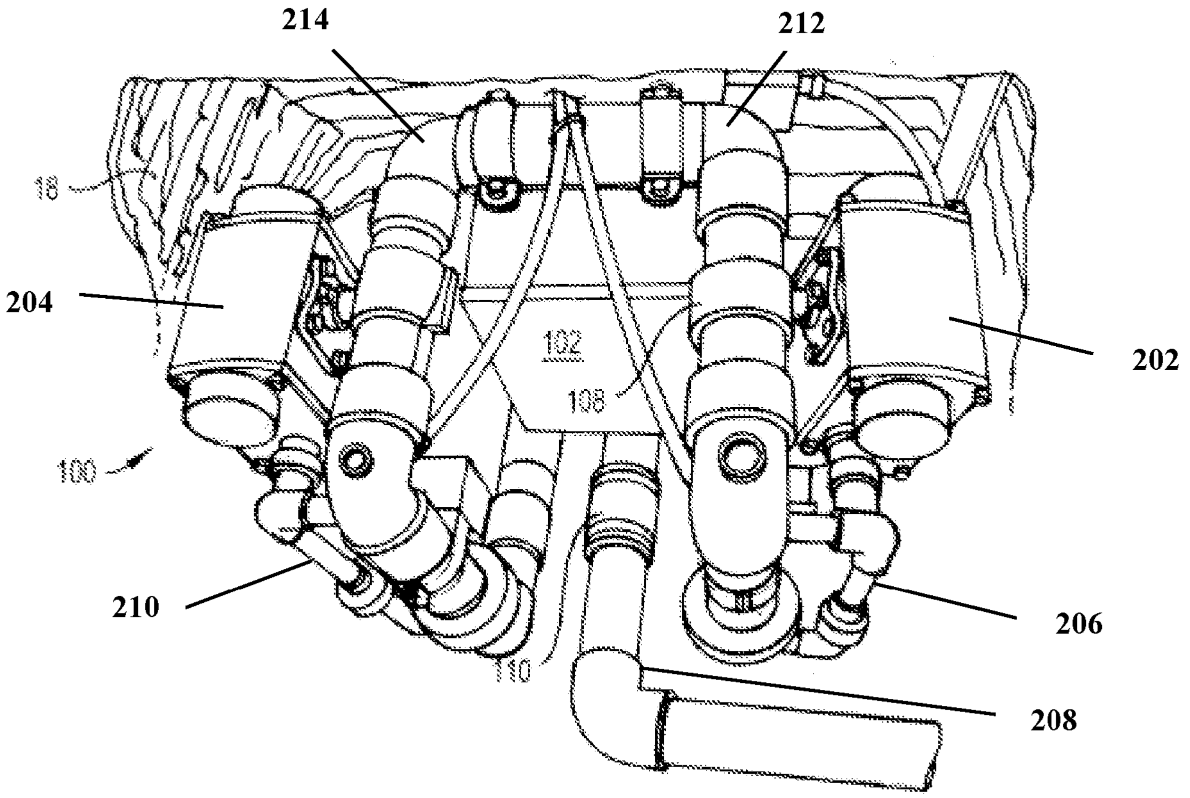
FIG. 10 is a condensate flow meter.

For example, referring to FIG. 10 the moisture measurement device or moisture detector 100, such as a condensate flow meter, can be provided at the dehumidifier 18 to monitor the water emitted from the drying process thereby providing avoiding over drying the product causing degradation of the product being dried. The moisture measurement device includes a processing device 102 such as a local controller or programmable logic controller (PLC), and a water level sensor that detects the water level emitted from the drying process. The PLC receives the detected water level and controls the fans 24, 10, and dehumidifier 18 to provide a desired rate of drying and to shut OFF the circulation and heat intake fans 24, 10 and dehumidifier 18 when the desired moisture content is reached. In one embodiment, the moisture measurement device 100 includes a water level sensor or probe 104, a water container 106 that holds 1 liter of water, an inlet valve 108 and an outlet valve 110.

In one embodiment shown in FIG. 10, a kiln has a kiln body forming an enclosure with a kiln interior, a solar heater outside of said kiln body to generate heated air, a plenum coupled to said solar heater and said kiln body to provide the heated air to the kiln interior, and one or more circulation fans inside said kiln interior to circulate air inside said kiln interior. A dehumidifier removes air from said kiln interior, dehumidify the removed air, and introduce dehumidified air into said kiln interior. A moisture detection apparatus has a moisture detector to determine a drying rate inside the kiln interior.

The moisture detection apparatus includes: a first water reservoir 202; a second water reservoir 204; a first inlet tube 206 coupled to an output of said dehumidifier; a second inlet tube 208 coupled to said first water reservoir; a third inlet tube 210 coupled to said first and/or second water reservoir; a first inlet valve coupled to said first inlet tube, said second inlet tube and said third inlet tube to direct water from the output of said dehumidifier to said first and/or said second water reservoir; a first outlet tube 212 coupled to said first water reservoir and an exterior of said kiln body; a first outlet valve to direct water from said first water reservoir to the exterior of said kiln body; a second outlet tube 214 coupled to said second water reservoir and the exterior of said kiln body; a second outlet valve to direct water from said second water reservoir to the exterior of said kiln body; and a controller operating the first inlet valve, first outlet valve, and second outlet valve.

It should be noted that the flow rate is directly related to the drying rate, and air flow is a function of the drying rate. As wood or other material in the kiln dries, it gives off water. In the solar hybrid kiln, water is collected (e.g., by the dehumidifier) at various intervals and measured. When the water volume decreases, that indicates that the drying rate is slowing. When this happens, the air velocity can be lowered by slowing the fan speed, which in turn saves electricity. The controller or PLC operates the system automatically. In one embodiment, two containers are provided with level sensors, for example one or both containers can be provided at one or more of the dehumidifier(s). When the sensor detects that the water reaches the full mark for the first container, a signal is sent to the controller or PLC. The controller or PLC then sends a control signal to operate one or more inlet valves that are coupled to the containers by a first inlet tube and the water source (e.g., the dehumidifier output) by a second inlet tube. The inlet valves then switches the water so it is collected at the second container and not at the first container.

At the same time, the controller or PLC sends a control signal to an outlet valve coupled to the first and/or second containers by a first outlet tube(s) and to the exterior of the kiln body by a second outlet tube, to dump the water from the first container, which can take about one minute to release the water to the exterior of the kiln body. And, the controller or PLC determines the drying rate based on the time it took for the first container to be full. If the drying rate has slowed, the controller or PLC sends a control signal to one or more fans to slow down.

Water container is to hold 1 liter at this point the water would touch the water probe signaling the PLC to shut off inlet valve, increment Liter counters (there are two counters 24 HR and TTL run) and open dump valve. It takes average of 1 minute to empty the container the valve will stay open. The valves are low Voltage (12 v DC). The initial Output is 12 Volts After 30 sec. Drops to 5.5 Volts.

The PLC or controller also starts and stops the kiln, such as to activate the fans, dehumidifier, and moisture detector, and to operate any backup power supply in the event the solar source power is insufficient. And, it can restart the kiln after a power failure or the like.

The controller or PLC also directly controls variable fan speed, start and direction, dehumidifier (DH) Units North, South and Solar wall fan. The PLC can communicate with the PC controller over RS232 Line at 19200-Baud rate, no Parity and CRC checking. The PLC can send Timing data and Running info to PC. The controller stores all data for the process to a file and saves it to hard drive. The controller also communicates with the VFD and Power Meter using RS485—Modbus protocol.

In on embodiment, as the dehumidifier 18 removes water from the air, it is collected in the container 106 through the intake valve 108. Once the water level touches the water probe 104, the probe 104 sends a signal to the PLC 102, which in turn shuts off the inlet valve 108, increments Liter counters (there are two counters 24 HR and TTL run) and opens the dump valve 110. It takes a predetermined dump time (usually about 1 minute) to empty the container 106, so the dump valve 110 will stay open for a longer period of time (about two and one half minutes) so that the container 106 empties to the kiln exterior 40 through an outlet tube or the like. The PLC 102 then shuts off the outlet valve 110 and opens the inlet valve 108, so that water again collects in the container 106.

Figure 11:
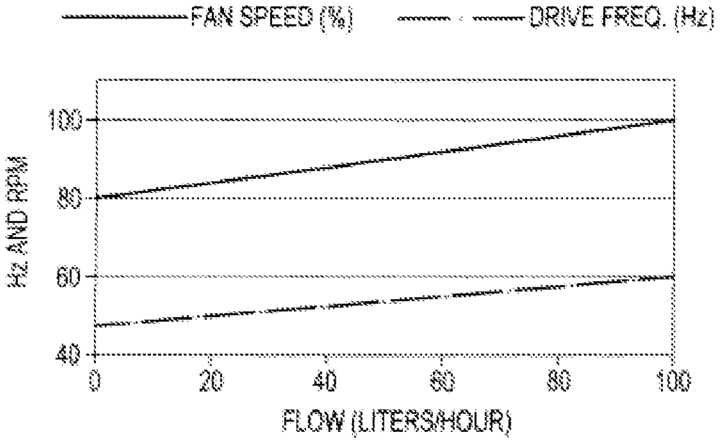
FIG. 11 is a chart showing a scheduled operation.

Each counter is associated with a respective water reservoir and measures the time it takes for that reservoir to fill with water (as detected by the water sensor). At the start of a new cycle (i.e., after the water in a particular reservoir is dumped and water is directed back to fill that reservoir), the counters are cleared. Once the reservoir fills with water, the time on the counter is recorded and the drying rate can be determined. The moisture content of the product can be known at the start of the drying, such as by taking a sample, weight and the time to dry. The longer it takes for the reservoir to fill, the lower the drying rate and the lower the moisture content of the product being dried. In one embodiment, the flow meter cycle count is converted to liters/hour, and the controller or PLC controls the fans to a speed between 80-100% proportionate to the flow measured, though the fans can be set to any suitable speed. It is further noted that the controller or PLC can be programmed with a set schedule, such as shown in FIG. 11, whereby the fan speed is automatically controlled at set time without use of a moisture detector. However, a detected low flow rate by the moisture detector can automatically advance the kiln schedule to the next step, reducing overall drying time. And the PLC or controller can be programmed with adjustable temperature set points so that temperature is raised or lower if it passes that set point.

The condensate flows into one of the reservoirs with level switches at the bottom FIG. 10, and when it fills the flow is switched to the second reservoir and the first reservoir is emptied ready for the next cycle.

Accordingly, the moisture detection apparatus can have a moisture detector to determine a drying rate inside the kiln interior. The moisture detector apparatus can have one or more water reservoirs, one or more inlet tubes coupled to the one or more water reservoirs and an output of the dehumidifier, one or more inlet valves coupled to said one or more inlet tubes to direct water from the output of the dehumidifier to the one or more water reservoirs via one or more inlet tubes, one or more outlet tubes coupled to the one or more reservoirs and an exterior of the kiln body, one or more outlet valves coupled to the one or more outlet tubes and to the one or more reservoirs to direct water from said one or more reservoirs to the exterior of the kiln body, and one or more sensors positioned in the one or more water reservoirs to detect a water level. Thus, for instance, there can be two water reservoirs, and separate inlet tubes leading from the dehumidifier output to each reservoir, and each inlet tube can have a separate valve or a shared valve that directs water to or prevents water from entering that reservoir.

And each water reservoir can have separate outlet valves and separate or shared outlet tubes that direct water from the water reservoir to an exterior of the kiln body. A controller is coupled to the one or more inlet valves, one or more outlet valves and one or more sensors, and operating the one or more inlet valves and one or more outlet valves based on the detected water level by determining a drying rate. The drying rate can be determined, for example, by determining how long it took for the reservoir to fill up and determining the amount of water per cycle (e.g., liters per hour). The controller further operates the one or more circulating fans, heater fan, backup heater, and dehumidifier based on the drying rate or the detected water level.

The PLC can have several Control Modes, namely Humidity Control, Depression Control, Ramped control. In the humidity control mode, the dehumidifiers and fans are removing moisture from the air that might be introduced from external air when the doors are opened and the product is first loaded into the kiln interior. The depression control sets the Equilibrium Moisture Content (EMC) and relative humidity for the kiln, and determines the drying time, and can be for example a table. Once the air humidity is reduced, the PLC can enter the mode. The Ramped Control mode ramps up the temperature and/or fan speed for higher drying, and ramps down the temperature and/or fan speed for slower drying. The operation may ramp up in the beginning until the humidity of the air is removed and the product releases larger amounts of moisture, and then ramp down once a certain drying rate threshold is passed.

The Dry Set Point (DSP) is the temperature at which the dehumidifier units are turned ON or OFF. For example, if the user sets the DSP for a particular product to 8% final moisture content, the dehumidifiers will be turned off when that level is obtained.

As noted, the PLC or controller also controls operation of the fans. The fans can have several speeds as well as ON, OFF, Forward, Reverse. The PLCE can operate the fans intermittently between forward and reverse for set periods of time to ensure complete circulation of air about the product being dried. For instance, the PLC can operate the fans in forward for 30 minutes, then reverse for 30 minutes, and keep repeating. That way, air is circulated completely about and through the product so that the product is evenly dried, and so that one side of the product is not overdried or underdried. The PLC or controller can also control the baffles (position), vents (open/close) and vent fans (speed, ON, OFF), ending and damper control, as needed.

If control mode for solar fan to entry air the kiln fans are switched to Reverse so the heat is pushed through the lumber before it exits from kiln. In this mode there is no reversing while running the solar fan, as soon as we switch to dehumidifier units the kiln fans switched to Forward. In the Forward direction the warm air from the solar wall would go over the lumber and out trough the side vent, it would be a waste of warm air and power for the kiln fans and solar fan. If this mode were not turned on the fans would be reversing by the time set in the Fans Control.

As discussed, operation of the moisture detector 100 is controlled by the PLC 102. However, the operation of the moisture detector can be controlled by the controller 80. For instance, the PLC can transmit information to the controller so that the controller 80 opens and shuts the valves via the PLC, and can also control operation of the fans 28, 10 and the dehumidifier 18. In addition, the PLC can be removed and the probe can transmit signals directly to the controller 80 and the controller 80 can directly control the valves.

When the Solar wall temperature in the evening goes below dry set point the solar fan is shut off and the dehumidifier units are started up. The dehumidifier units will run over night in the morning when the solar wall temperature goes above dry set point and hysterics the dehumidifier units shut off and the solar fan turned on.

The basic control system can be designed for manual control while learning the operational characteristics and performance parameters of the novel hybrid solar/dehumidifier drying process. Settings for circulation fan speed, timing of dehumidifier and solar heater operation can be manually set. One automated function is the closed loop control for the fan. This unit was defined for HVAC operation, taking advantage of the key characteristic of the solar panel array at a given ambient condition (air temperature and insolation) increasing fan flow (speed) reduces the output temperature but increases heat output. The level and gain of the control is set to maintain output temperature within a predetermined range while maximizing solar heat capture. The PLC or controller can also generate reports on a regular basis, such as hourly, daily, weekly or monthly, including factors such as fan data, power consumption, moisture level, drying rate, temperature, which can be collected by respective sensors located throughout the kiln at regular time intervals, and can be used to predict future properties and schedules. To measure the relative humidity in the drying chamber, wet and dry bulb can be used as thermometers. The dry bulb measures the interior temperature of the dry air, while the wet bulb measures the interior temperature of the moist air.

If the output temperature falls below a limit, the fan may shut off. The control circuit diagram and the control panel are shown in FIG. 9. The control panel, for example, can have buttons to set the schedule, temperature, desired final moisture content, dry set point, air flow, timing, moisture, air flow, etc.

Referring to FIG. 11, the flow meter cycle count is converted to liters/hour, and the control is programmed to set the circulation fan speed between 80% and 100% proportionate to the flow measured. This in turn reduces electrical power draw. A low flow rate may also be programmed to automatic advance the kiln schedule to the next step, reducing overall drying time. The circulating fans can also be lowered as the kiln heats up snice less air flow will be needed.

The kiln can be used for any suitable purpose. However, the kiln is especially useful to dry product such as biochar, lumber, coal, cocoa, coffee, agricultural products. Wire trays can be provided to hold smaller product, such as chips or biochar or other agricultural product such as cocoa or leaves. The product is placed in the wire tray and the wire tray is set in the kiln, such as on wire shelves, frames or the like, so that air can flow through and around the trays and product. The wire trays ensure that the product is uniformly dried. The kiln interior can also have a separate control room and drying room. The control room can keep the electronics such as the PLC or controller. And thermal insulation can be provided, as needed for a particular application.

Within this specification, the various sizes, shapes and dimensions are approximate and exemplary to illustrate the scope of the invention and are not limiting. The sizes and the terms "substantially" and "about" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

Also within this written description and figures, a certain number of elements are shown and described, such as baffles 56, fans 24, doors, vents 38, dampers 44. It will be recognized that any suitable number of elements, more or fewer than shown and described, can be provided and not all elements are necessary to the invention. In addition, each of the exemplary embodiments described above may be realized separately or in combination with other exemplary embodiments. In addition, features, components or elements from one embodiment can be utilized with or in other embodiments. For example, the fans, doors, vents, dampers or baffles shown in one embodiment can be utilized in other embodiments where fans, doors, vents, dampers or baffles might not be shown.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way.

We claim:

1. A kiln comprising:

a kiln body forming an enclosure with a kiln interior;

a solar heater outside of said kiln body to generate heated air;

a plenum coupled to said solar heater and said kiln body to provide the heated air to the kiln interior;

one or more circulation fans inside said kiln interior to circulate air inside said kiln interior;

a dehumidifier to remove air from said kiln interior, dehumidify the removed air, and introduce dehumidified air into said kiln interior; and a moisture detection apparatus having a moisture detector to determine a drying rate inside the kiln interior, said moisture detection apparatus comprising:

a first water reservoir;

a second water reservoir;

a first inlet tube coupled to an output of said dehumidifier;

a second inlet tube coupled to said first water reservoir;

a third inlet tube coupled to said first and/or second water reservoir;

a first inlet valve coupled to said first inlet tube, said second inlet tube and said third inlet tube to direct water from the output of said dehumidifier to said first and/or said second water reservoir;

a first outlet tube coupled to said first water reservoir and an exterior of said kiln body;

a first outlet valve to direct water from said first water reservoir to the exterior of said kiln body;

a second outlet tube coupled to said second water reservoir and the exterior of said kiln body;

a second outlet valve to direct water from said second water reservoir to the exterior of said kiln body; and a controller operating the first inlet valve, first outlet valve, and second outlet valve.

2. The kiln of claim 1, wherein the enclosure is airtight.

3. The kiln of claim 1, further comprising one or more baffles inside said kiln interior to direct air flow within the kiln interior.

4. The kiln of claim 1, wherein said dehumidifier is inside said kiln interior.

5. The kiln of claim 1, wherein said dehumidifier is outside said kiln body and coupled to said kiln body.

6. The kiln of claim 1, further comprising a heater fan to draw into said kiln interior from said plenum.

7. The kiln of claim 1, further comprising a backup heater, said controller operating said backup heater when said solar heater is unable to provide sufficient heated air.

8. The kiln of claim 7, wherein said backup heater has a power source.

9. The kiln of claim 8, wherein said power source is electric, gas, coal, wood, or pellets.

10. The kiln of claim 1, wherein:

the first inlet tube is further coupled to said first water reservoir and an output of said dehumidifier;

the first inlet valve is further coupled to said first inlet tube to direct water from the output of said dehumidifier to the first water reservoir;

the second inlet tube is further coupled to said second water reservoir and the output of said dehumidifier; and a second inlet valve coupled to said second inlet tube to direct water from the output of said dehumidifier to the second water reservoir.

11. The kiln of claim 10, wherein:

the first outlet tube is coupled to said first water reservoir and a kiln output;

the first outlet valve is coupled to said first outlet tube to direct water from said first water reservoir to said kiln output;

the second outlet tube is coupled to said second water reservoir and the kiln output; and the second outlet valve is coupled to said second outlet tube to direct water from said second water reservoir to said kiln output.

12. The kiln of claim 11, said moisture detection apparatus further comprising:

a first water sensor positioned in said first water reservoir to detect a first water level and generate a first water level output;

a second water sensor positioned in said second water reservoir to detect a second water level and generate a second water level output; and a controller receiving the first water level output and the second water level output and determine the drying rate inside the kiln interior based on the received first and second water level outputs.

13. The kiln of claim 1, said moisture detector comprising a water sensor detecting an amount of water removed by said dehumidifier and a controller to determine the drying rate inside the kiln interior based on the detected amount of removed water.

14. The kiln of claim 13, wherein said water sensor is positioned in said water reservoir to detect a water level in said water reservoir.

15. The kiln of claim 1, further comprising a vent located in the kiln body to vent excess air from said kiln interior.

16. The kiln of claim 15, further comprising a damper positioned at said vent to prevent external air from entering said kiln interior through said vent.

17. A kiln comprising:

a kiln body forming an enclosure with a kiln interior;

a solar heater outside of said kiln body to generate heated air;

a plenum coupled to said solar heater and said kiln body to provide the heated air to the kiln interior;

one or more circulation fans inside said kiln interior to circulate air inside said kiln interior;

a dehumidifier to remove air from said kiln interior, dehumidify the removed air, and introduce dehumidified air into said kiln interior; and a moisture detection apparatus having a moisture detector to determine a drying rate inside the kiln interior, said moisture detection apparatus comprising:

one or more water reservoirs;

one or more inlet tubes coupled to said one or more water reservoirs and an output of said dehumidifier;

one or more inlet valves coupled to said one or more inlet tubes to direct water from the output of said dehumidifier to said one or more water reservoirs via one or more inlet tubes;

one or more outlet tubes coupled to said one or more reservoirs and an exterior of said kiln body;

one or more outlet valves coupled to said one or more outlet tubes and to said one or more reservoirs to direct water from said one or more reservoirs to the exterior of said kiln body;

one or more sensors positioned in said one or more water reservoirs to detect a water level;

a controller coupled to said one or more inlet valves, said one or more outlet valves and said one or more sensors, and operating the one or more inlet valves and the one or more outlet valves based on the detected water level.

18. The kiln of claim 6, said controller further operating said one or more circulation fans, said heater fan, a backup heater, and said dehumidifier based on the drying rate or the detected water level.

* * * * *